United States Patent
Cao et al.

(10) Patent No.: US 12,283,989 B1
(45) Date of Patent: Apr. 22, 2025

(54) METHOD AND DEVICE FOR OPTICALLY-CARRIED INFORMATION TRANSMISSION BASED ON FULL-SPECTRUM LED

(71) Applicants: XUYU OPTOELECTRONICS (SHENZHEN) CO., LTD., Shenzhen (CN); GUANGDONG XUYU OPTOELECTRONICS CO., LTD., Dongguan (CN)

(72) Inventors: Xiaobing Cao, Shenzhen (CN); Jintian Lin, Shenzhen (CN); Lei Chen, Shenzhen (CN); Fu Du, Shenzhen (CN)

(73) Assignees: XUYU OPTOELECTRONICS (SHENZHEN) CO., LTD., Shenzhen (CN); GUANGDONG XUYU OPTOELECTRONICS CO., LTD., Dongguan (CN)

( * ) Notice: Subject to any disclaimer, the term of this patent is extended or adjusted under 35 U.S.C. 154(b) by 0 days.

(21) Appl. No.: 18/969,312

(22) Filed: Dec. 5, 2024

(30) Foreign Application Priority Data

Sep. 6, 2024 (CN) .......................... 202411250653.5

(51) Int. Cl.
*H04B 10/11* (2013.01)
*H04B 10/079* (2013.01)
(Continued)

(52) U.S. Cl.
CPC ..... *H04B 10/116* (2013.01); *H04B 10/07953* (2013.01); *H04B 10/07955* (2013.01);
(Continued)

(58) Field of Classification Search
CPC .............. H04B 10/07955; H04B 10/11; H04B 10/114–116; H04B 10/502; H04B 10/506; H05B 47/11; H05B 45/10
(Continued)

(56) References Cited

U.S. PATENT DOCUMENTS

| 8,299,722 B2 * | 10/2012 | Melanson | ............. | H05B 45/22 |
| | | | | 315/307 |
| 2009/0196613 A1 * | 8/2009 | Linnartz | ................ | H05B 45/22 |
| | | | | 398/118 |

(Continued)

FOREIGN PATENT DOCUMENTS

| CN | 104539363 A | * | 4/2015 |
| CN | 113739087 A | * | 12/2021 |
| CN | 118300686 A | | 7/2024 |

*Primary Examiner* — Li Liu

(74) *Attorney, Agent, or Firm* — Andrew C. Cheng

(57) ABSTRACT

The invention relates to the field of optically-carried information technology and provides a method and device for optically-carried information transmission based on full-spectrum LEDs. The method addresses the problem of visual perception interference caused by multi-color LEDs used for data transmission in the prior art. The method includes: dividing the data to be transmitted according to the first transmission demand information, obtaining a second preset number of data segments; selecting target monochromatic LEDs based on the luminous characteristics of the LEDs and the first transmission demand information; processing the data segments using the target LEDs and preset modulation algorithms to generate corresponding LED control signals; and controlling the target LEDs to transmit optically-carried information based on the control signals. This invention ensures optical communication performance while effectively reducing interference, thus improving the reliability of the optically-carried information system.

14 Claims, 4 Drawing Sheets

(51) Int. Cl.
  *H04B 10/114* (2013.01)
  *H04B 10/116* (2013.01)
  *H04B 10/50* (2013.01)
  *H05B 45/10* (2020.01)
  *H05B 47/11* (2020.01)

(52) U.S. Cl.
  CPC ......... *H04B 10/114* (2013.01); *H04B 10/502* (2013.01); *H04B 10/506* (2013.01); *H05B 45/10* (2020.01); *H05B 47/11* (2020.01)

(58) Field of Classification Search
  USPC ............. 398/25, 38, 118–120, 127–128, 130
  See application file for complete search history.

(56) References Cited

U.S. PATENT DOCUMENTS

| | | | |
|---|---|---|---|
| 2012/0080944 A1* | 4/2012 | Recker | H02J 9/02 |
| | | | 307/25 |
| 2017/0251392 A1 | 8/2017 | Nabetani | |
| 2021/0000025 A1* | 1/2021 | Probasco | A01G 22/00 |
| 2021/0162912 A1* | 6/2021 | Spero | F21S 41/153 |

\* cited by examiner splitting data to be transmitted according to first transmission requirement information to obtain a second predetermined number of data fragments — S1 determining a second predetermined number of target monochromatic LEDs according to light emission characteristics of the monochromatic LEDs and the first transmission requirement information — S2 processing corresponding data fragments for each target monochromatic LED according to a preset modulation algorithm corresponding to each monochromatic LED, thereby generating respective light source control signals — S3 controlling the target monochromatic LEDs to perform optically-carried information transmission according to the light source control signals — S4

FIG. 1 monitoring qualities of information transmission in real-time to obtain communication quality monitoring results of each target monochromatic LED ── S5 when the signal strength of one target monochromatic LED is below the preset signal strength threshold, and/or its error rate exceeds the preset error rate threshold, and/or its transmission delay exceeds the preset delay threshold, designating target monochromatic LED as an LED to be switched ── S6 determining at least one monochromatic LED as a target switch LED based on the data fragment corresponding to the LED to be switched ── S7 controlling the target switch LED to transmit the data fragments corresponding to the LED to be switched according to a preset light source switching rule ── S8

FIG. 3

METHOD AND DEVICE FOR OPTICALLY-CARRIED INFORMATION TRANSMISSION BASED ON FULL-SPECTRUM LED

TECHNICAL FIELD

The present disclosure relates to the technical field of optically-carried information, and in particular to a method and device for optically-carried information transmission based on full spectrum LED

BACKGROUND

Optically-carried information technology is a technique that utilizes optical signals as carriers for information transmission. Compared to traditional electromagnetic wave signal transmission technologies, optically-carried information technology offers higher bandwidth, faster transmission speeds, and lower signal attenuation. It is widely used in fields such as optical fiber communication and Visible Light Communication (VLC), greatly advancing the development of modern communication technologies. This technology not only plays a significant role in improving communication efficiency and quality, but also demonstrates notable advantages in reducing energy consumption and minimizing electromagnetic interference.

The multicolor optically-carried information transmission scheme is an innovative application of optically-carried information technology, wherein multiple light sources with different wavelengths are used to transmit different data segments simultaneously, enabling high-speed and high-capacity information transmission. In this scheme, each monochromatic LED is responsible for transmitting optical signals within a specific wavelength range. Multiple monochromatic LEDs work together to achieve bandwidth aggregation and an increase in data transmission rate.

Although existing multicolor optically-carried information transmission schemes have made significant progress in improving transmission speed and capacity, there are still several issues that need to be addressed. One major issue is that when all the multicolor light sources are used simultaneously for data transmission, they may cause perceptible effects to the human eye. This perceptible effect not only impacts the user experience but may also pose health risks, especially in Visible Light Communication (VLC) systems, where prolonged exposure to high-frequency flickering light sources can have adverse effects on the visual system.

SUMMARY

The present disclosure provides a method and device for optically-carried information transmission based on full spectrum LED, aimed at solving the problem in the prior art where the simultaneous use of multicolor LEDs for data transmission can cause perceptible visual disturbances to the human eye.

In a first aspect, the present disclosure provides a method device for optically-carried information transmission based on full spectrum LED, applied at a transmitting end, wherein the transmitting end comprises a full-spectrum semiconductor light-emitting device, which comprises a first predetermined number of monochromatic LEDs with different emission wavelengths, an emission wavelength adjustment range of each monochromatic LED belongs to different wavelength intervals, the method comprises:

splitting data to be transmitted according to first transmission requirement information to obtain a second predetermined number of data fragments, wherein the second predetermined number is less than or equal to a first predetermined number, determining a second predetermined number of target monochromatic LEDs according to light emission characteristics of the monochromatic LEDs and the first transmission requirement information, processing corresponding data fragments for each target monochromatic LED according to a preset modulation algorithm corresponding to each monochromatic LED, thereby generating respective light source control signals, and, controlling the target monochromatic LEDs to perform optically-carried information transmission according to the light source control signals.

As a preferred embodiment of the present disclosure, the step of determining a second predetermined number of target monochromatic LEDs according to light emission characteristics of the monochromatic LEDs and the first transmission requirement information comprises:

determining second transmission requirement information for each data fragment according to the first transmission requirement information, wherein the first transmission requirement information includes bandwidth and rate requirement parameters, selecting the monochromatic LEDs according to the second transmission requirement information to obtain candidate monochromatic LEDs, wherein a number of the candidate monochromatic LEDs is greater than or equal to the second predetermined number and less than or equal to the first predetermined number, when the number of candidate monochromatic LEDs exceeds the second predetermined number, determining the second predetermined number of candidate monochromatic LEDs as target monochromatic LEDs according to the light emission characteristics of the candidate monochromatic LEDs;

and, when the number of candidate monochromatic LEDs is equal to the second predetermined number, assigning the candidate monochromatic LEDs as target monochromatic LEDs.

As a preferred embodiment of the present disclosure, the step of when the number of candidate monochromatic LEDs exceeds the second predetermined number, determining the second predetermined number of candidate monochromatic LEDs as target monochromatic LEDs according to the light emission characteristics of the candidate monochromatic LEDs comprises:

obtaining a light emission characteristic parameter of each candidate monochromatic LED, wherein the light emission characteristic parameter includes: emission wavelength, spectral width, and light intensity, obtaining a visual acuity function value of each candidate monochromatic LED according to the emission wavelength and a visual acuity function, determining an eye interference index for each candidate monochromatic LED based on the visual acuity function value, emission wavelength, spectral width, and light intensity, wherein the eye interference index is positively correlated with the sensitivity function value and light intensity, and negatively correlated with the spectral width and light intensity, and, sorting the candidate monochromatic LEDs in descending order of the eye interference index, and selecting the top second predetermined number of candidate monochromatic LEDs as the target monochromatic LEDs.

As a preferred embodiment of the present disclosure, the step of processing corresponding data fragments for each target monochromatic LED according to a preset modulation algorithm corresponding to each monochromatic LED, thereby generating respective light source control signals comprises:
- obtaining frequency response characteristics of each target monochromatic LED, wherein the frequency response characteristics include: operating frequency range, bandwidth capacity, modulation efficiency, and maximum transmission rate;
- obtaining second transmission requirement information for each data fragment, wherein the second transmission requirement information includes: data fragment bandwidth requirement, data fragment rate requirement, and priority,
- calculating a difference between the bandwidth capacity of each target monochromatic LED and the bandwidth requirement of each corresponding data fragment, referred to as a first difference value;
- calculating a difference between the maximum transmission rate of each target monochromatic LED and the data fragment rate requirement of each corresponding data fragment, referred to as a second difference value;
- establishing an initial matching list for each data fragment according to the first difference value and second difference value, wherein the initial matching list includes several target monochromatic LEDs that meet a preset transmission condition, and the preset transmission condition includes: the first difference value being greater than or equal to a first difference threshold and the second difference value being greater than or equal to a second difference threshold;
- sorting each initial matching list in ascending order according to a weighted calculation of the first difference value and the second difference value;
- when duplicate target monochromatic LEDs exist in the initial matching lists, removing the duplicate target monochromatic LED based on the priority;
- establishing a mapping relationship between the data fragment and the first target monochromatic LED in the corresponding initial matching list;
- determining a target modulation algorithm according to the second transmission requirement information of the data fragment, the frequency response characteristics of the corresponding target monochromatic LED, and preset modulation algorithm, wherein the preset modulation algorithms include: PPM modulation algorithm, PAM modulation algorithm, QAM modulation algorithm, and OFDM modulation algorithm;
- encoding and modulating the data fragment by corresponding target modulation algorithm, thereby generating respective light source control signals.

In a preferred embodiment of the present disclosure, the step of determining a target modulation algorithm according to the second transmission requirement information of the data fragment, the frequency response characteristics of the corresponding target monochromatic LED, and preset modulation algorithm comprises:
- assigning several preset modulation algorithms that satisfy the corresponding second transmission requirement information for each data fragment based on the frequency response characteristics of the corresponding target monochromatic LED, referred to as the first intermediate modulation algorithms;
- obtaining an estimated optical pulse frequency of the data fragment after modulation by the corresponding first intermediate modulation algorithm;
- obtaining corresponding critical flicker frequency according to the emission wavelength of each target monochromatic LED;
- filtering the first intermediate modulation algorithms for each data fragment based on the critical flicker frequency and the estimated optical pulse frequency to obtain several second intermediate modulation algorithms;
- determining the target modulation algorithm for each data fragment according to the second intermediate modulation algorithm.

In a preferred embodiment of the present disclosure, the step of controlling the target monochromatic LEDs to perform optically-carried information transmission according to the light source control signals comprises:
- acquiring an ambient light parameter, where the ambient light parameters include ambient light intensity and ambient spectral distribution;
- when the first predetermined number equals the second predetermined number, adjusting each light source control signal according to the ambient light intensity, ambient spectral distribution, and the preset filtering algorithm to obtain a first target control signal;
- according to the first target control signal, controlling the corresponding target monochromatic LEDs to perform optically-carried information based on;
- when the first predetermined number is greater than the second predetermined number, adjusting each light source control signals for according to the ambient light parameters, preset filtering algorithm, and preset light emission intensity to obtain a first target control signal;
- acquiring a first actual light emission intensity for each target monochromatic LED based on the first target control signal;
- acquiring a supplementary light emission intensity according to the first actual light emission intensity, the preset light emission intensity, and the ambient light intensity;
- calculating a total target light emission intensity for the monochromatic LEDs other than the target monochromatic LEDs according to the supplementary light emission intensity;
- determining target light emission intensity for each monochromatic LED other than the target monochromatic LEDs according to the total target light emission intensities and the ambient spectral distribution;
- generating second target control signals for all unused monochromatic LEDs based on the target light emission intensity;
- controlling the corresponding monochromatic LEDs to optically-carried information transmission according to the first target control signals and the second target control signals.

As a preferred embodiment of the present disclosure, after the step of controlling the target monochromatic LEDs to perform optically-carried information transmission according to the light source control signals, the method further comprises:
- monitoring qualities of information transmission in real-time to obtain communication quality monitoring results of each target monochromatic LED, wherein the communication quality monitoring results include signal strength, error rate, and transmission delay;

When the signal strength of one target monochromatic LED is below the preset signal strength threshold, and/or its error rate exceeds the preset error rate threshold, and/or its transmission delay exceeds the preset delay threshold, designating target monochromatic LED as an LED to be switched;

determining at least one monochromatic LED as a target switch LED based on the data fragment corresponding to the LED to be switched;

controlling the target switch LED to transmit the data fragments corresponding to the LED to be switched according to a preset light source switching rule;

As a preferred embodiment of the present disclosure, the step of determining at least one monochromatic LED as a target switch LED based on the data fragment corresponding to the LED to be switched comprises:

acquiring the second transmission requirement information for the data fragment corresponding to the LED to be switched, wherein the second transmission requirement information includes: data fragment bandwidth requirement, data fragment rate requirement, and priority;

caching the data fragment corresponding to the LED to be switched to obtain a cached data fragment;

when the second predetermined number is less than the first predetermined number, acquiring the monochromatic LEDs other than the target monochromatic LED as first backup switch LEDs;

obtaining wavelength similarities between the emission wavelength of each first backup switch LED and the emission wavelength of the LED to be switched;

selecting the first backup switch LED that meets a preset switching condition as a target switch LED according to the wavelength similarity, the second transmission requirement information, and the frequency response characteristics of each first backup switch LED;

when the second predetermined number equals the first predetermined number, acquiring bandwidth margin of the target monochromatic LEDs other than the LED to be switched based on the communication quality monitoring results;

obtaining several first backup switch LED combinations that satisfy the second transmission requirement information of the data fragment corresponding to the LED to be switched according to the bandwidth margin, wherein each first backup switch LED combination includes at least one target monochromatic LED other than the LED to be switched, and at least one target monochromatic LED differs between any two first backup switch LED combinations;

filtering to obtain several second backup switch LED combinations according to the frequency response characteristics of the target monochromatic LEDs in each first backup switch LED combination and the data fragment rate requirement of the data fragment corresponding to the LED to be switched;

calculating the redundancy degree for each second backup switch LED combination according to a weighted calculation of a redundancy light source amount and a redundancy bandwidth capacity for each second backup switch LED combination, wherein a weight of the redundancy light source amount is greater than a weight of the redundancy bandwidth capacity;

selecting the second backup switch LED combination with the smallest redundancy degree to determine the target switch LED.

As a preferred embodiment of the present disclosure, the step of controlling the target switch LED to transmit the data fragments corresponding to the LED to be switched according to a preset light source switching rule comprises:

splitting the data fragment corresponding to the LED to be switched according to a preset data splitting ratio to obtain a first data fragment and a second data fragment;

Controlling the LED to be switched to transmit the first data fragment and controlling the target switch LED to transmit the second data fragment according to the preset modulation algorithm;

obtaining transmission quality of the second data fragment on the target switch LED at preset time intervals;

if the transmission quality meets the preset quality conditions, increasing the preset data splitting ratio by a preset incremental proportion, and returning to the step of splitting the data fragment corresponding to the LED to be switched according to a preset data splitting ratio to obtain a first data fragment and a second data fragment, until the data fragment of the LED to be switched is entirely transmitted through the target switch LED;

when the data fragment of the LED to be switched is entirely transmitted through the target switch LED, acquiring current second actual emission intensities of each target monochromatic LED and the target switch monochromatic LED;

obtaining a third light source control signal according to the second actual emission intensity, preset emission intensity, and ambient light intensity;

controlling the LED to be switched for illumination according to the third light source control signal.

In a second aspect, an embodiment of the present invention provides a storage medium on which computer program instructions are stored. When executed by a processor, these computer program instructions implement the method described in the first aspect of the aforementioned embodiments.

Beneficial Effects

By using monochromatic LEDs of different wavelengths to cover multiple wavelength ranges, the flexibility and bandwidth of the optically-carried information transmission system can be enhanced. The light source of Each wavelength range's operates independently, enabling parallel multi-channel transmission, which improves the overall transmission capacity and efficiency. Data segmentation based on transmission requirements ensures that the data load on each monochromatic LED is optimally allocated within its capacity. This segmentation and scheduling effectively reduce conflicts and collisions during data transmission, enhancing the system's stability and reliability. Selecting the most suitable target monochromatic LEDs according to their emission characteristics and transmission requirements optimizes signal quality and power efficiency for optical information transmission. Choosing appropriate light sources minimizes signal attenuation and distortion during transmission, ensuring reliable and stable data transfer. Based on the target monochromatic LEDs and transmission requirements, preset modulation algorithms can effectively increase transmission rate and precision. Various modulation algorithms can adapt to different transmission environments and conditions, enabling the optical information transmission system to maintain efficient operation in complex scenarios. Precisely controlling the target monochromatic LEDs through light source control signals enables efficient optical information transmission.

BRIEF DESCRIPTION OF THE DRAWINGS

To clarify the technical solutions of the embodiments in the present disclosure, the accompanying drawings used in the embodiments will be briefly introduced. For those skilled in the art, based on these drawings and without exerting inventive effort, other drawings can be obtained. All of these are within the scope of protection of the present disclosure.

FIG. 1 is a schematic diagram of the method for optically-carried information transmission based on full spectrum LED of embodiment of the present disclosure.

FIG. 3 is a schematic diagram of the method for optically-carried information transmission based on full spectrum LED of embodiment of the present disclosure.

DETAILED DESCRIPTION

Figure 2:
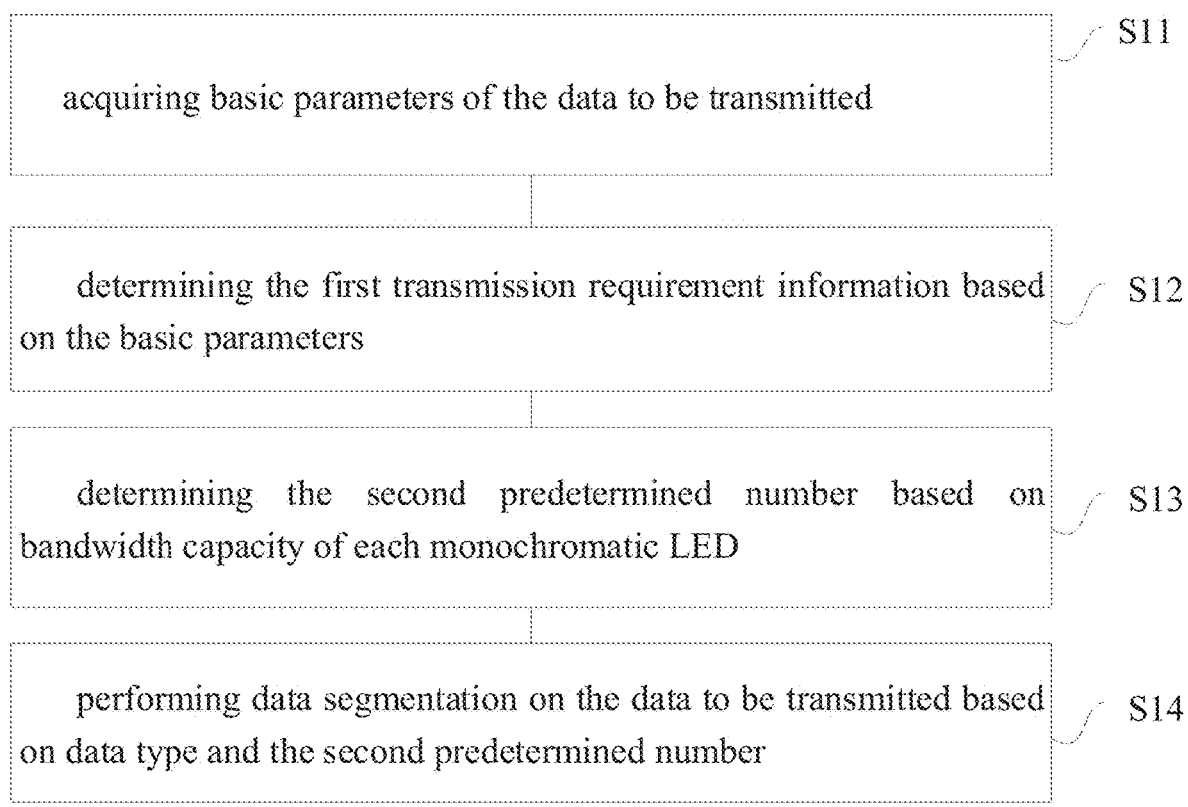
FIG. 2 is a schematic diagram of the method for optically-carried information transmission based on full spectrum LED of embodiment of the present disclosure.

The following provides a detailed description of various features and exemplary embodiments of this invention. To make the objectives, technical solutions, and advantages of the invention clearer, we will elaborate further on the invention with reference to accompanying drawings and examples. It should be understood that the specific embodiments described here are solely intended to illustrate the invention, and are not intended to define its limits. Those skilled in the art will recognize that the invention can be implemented without requiring some of these specific details. The descriptions of the embodiments are only meant to provide a better understanding of the invention by illustrating its examples.

It should also be noted that relational terms such as "first" and "second" are used herein solely to distinguish one entity or operation from another, without necessarily implying any actual relationship or order between such entities or operations. Furthermore, terms such as "comprising," "including," or any variations thereof, are intended to cover a non-exclusive inclusion, such that a process, method, article, or device that comprises a list of elements includes not only those elements but may also include other elements not expressly listed, or elements inherent to such a process, method, article, or device. Elements defined by the phrase "comprising . . . " do not exclude the presence of additional identical elements within the process, method, article, or device.

Additionally, it should be noted that all actions of acquiring signals, information, or data in this invention are conducted in compliance with the relevant data protection regulations and policies of the jurisdiction and are performed only with authorization granted by the respective device owners.

Embodiment 1

The embodiment of the present disclosure provides a method for optically-carried information transmission based on full spectrum LED, applied at a transmitting end, wherein the transmitting end comprises a full-spectrum semiconductor light-emitting device, which comprises a first predetermined number of monochromatic LEDs with different emission wavelengths, an emission wavelength adjustment range of each monochromatic LED belongs to different wavelength intervals;

Specifically, a full-spectrum light-emitting device refers to a device capable of emitting light across the entire visible spectrum and potentially including ultraviolet (UV) and infrared (IR) ranges. It typically consists of multiple monochromatic LEDs, each emitting light at a specific wavelength. By combining different wavelengths from these monochromatic LEDs, the transmitter can produce a light signal that spans the entire spectrum. This approach enables higher optical communication efficiency, as different wavelengths of light can carry more data within the same channel. The device includes a predetermined number of monochromatic LEDs, indicating a fixed and known count of LEDs in the design. These monochromatic LEDs are made from semiconductor materials, such as light-emitting diodes (LEDs), with each one having a specific emission wavelength. The emission wavelength of each monochromatic LED can be adjusted within certain limits. For instance, some semiconductor light sources allow slight wavelength tuning by adjusting current, voltage, or temperature.

The first predetermined number of monochromatic LEDs refers to the integrated number of LEDs in the device. These monochromatic LEDs can be different channels of an LED chip or different LED elements within an LED module, each emitting light with fixed wavelength characteristics.

Each monochromatic LED emits light within a distinct wavelength range on the spectrum. For example, the LEDs may cover different ranges such as red, green, and blue. This segmented wavelength distribution optimizes the diversity and flexibility of the optical information transmission system.

The combination of these features allows the optically-carried information transmission system to utilize multiple wavelengths for data transmission, where each monochromatic LED within a wavelength range can operate independently, enabling multi-channel parallel transmission. This design not only enhances the system's transmission capacity and bandwidth but also adapts to varying optical needs in different applications, such as requiring high color fidelity or increased transmission rates.

In a specific embodiment, the first predetermined number is four, designated as the first, second, third, and fourth monochromatic LEDs. The first LED emits light within 480-520 nm, the second within 530-540 nm, the third within 640-660 nm, and the fourth within 680-700 nm. Each LED is excited by blue light chips, with at least one first and one second blue light chip. Although both chips emit within the same wavelength range, their peak wavelengths differ. Using blue light chips with distinct peak wavelengths enables broader blue light coverage. When the first and second blue light chips are combined, the primary wavelength of the blue light chips falls between 447-457 nm.

In this embodiment, each monochromatic LED covers a different wavelength range, allowing for extensive spectral coverage. This design enables the optically-carried information transmission system to use various wavelengths for data transmission, thereby increasing system bandwidth and transmission capacity. Different wavelengths can better reproduce the spectral components of natural light, enhancing color fidelity. This is particularly important in applications requiring high color accuracy, such as display technologies and lighting. By using multiple wavelengths, the system achieves multi-channel parallel transmission, with each monochromatic LED operating independently, free from interference. This configuration improves data transmission speed and efficiency, meeting high-bandwidth demands.

The combination of the first and second blue light chips extends the blue light range (447-457 nm). Utilizing blue light chips with different peak wavelengths provides a more stable and uniform blue excitation source, improving overall system performance. Emission from various wavelengths can facilitate efficient data transmission without affecting human visual perception. The primary wavelength range of the blue light chips, at 447-457 nm, falls within a spectrum where human sensitivity is lower, helping to reduce visual fatigue and discomfort.

Referring to FIG. 1, the method comprises:

Step S1 of splitting data to be transmitted according to first transmission requirement information to obtain a second predetermined number of data fragments, wherein the second predetermined number is less than or equal to a first predetermined number;

Specifically, the first transmission requirement information refers to the specific needs of the data to be transmitted in terms of transmission rate, bandwidth, latency, and priority. Data segmentation divides the original data according to a set of rules to create multiple small data segments. In this step, based on the first transmission requirement information, the data to be transmitted is segmented to facilitate optimized transmission according to the characteristics of different light sources. This segmentation strategy divides the data into several segments, tailored to meet specific transmission needs.

Data segmentation enables each segment to be independently optimized based on its specific requirements, enhancing transmission efficiency and reliability. By segmenting data, the system can leverage the unique attributes of each light source, reducing resource waste and improving overall performance.

The number of monochromatic LEDs in the semiconductor light-emitting device is limited (first preset number), so the number of segmented data segments (second preset number) must not exceed this limit. Otherwise, it would be impossible to allocate a monochromatic LED for each data segment. Ensuring that the second predetermined number is less than or equal to the first predetermined number allows for rational allocation and utilization of LED resources, increasing the efficiency and stability of optical information transmission.

If all monochromatic LEDs are in use, it could increase interference in human perception. By controlling the second preset number, selective use of certain LEDs reduces interference and enhances data transmission discretion. Keeping the second predetermined number within the first predetermined number allows flexible scheduling and switching of LEDs as needed, adapting to the varying demands of data segments and environmental changes.

Preferably, referring to FIG. 2, the Step S1 of splitting data to be transmitted according to first transmission requirement information to obtain a second predetermined number of data fragments comprises:

Step S11 of acquiring basic parameters of the data to be transmitted;

The basic parameters are fundamental details about the data, including data type and data size. The data type specifies the category of the data, such as video, audio, or text. The data size represents the total amount of data, typically measured in bytes (B) or bits (b). Acquiring these parameters provides insight into the nature and scope of the data, setting the stage for analyzing transmission requirements and performing data segmentation.

Data type identification can be done through header information or predefined rules, such as reading the file's MIME type or identifying the data type through data markers. Knowing the data type and size enables tailored segmentation and transmission strategies, enhancing efficiency. Accurately measuring data size assists in precise calculations for transmission requirements and resource allocation.

Step S12: determining the first transmission requirement information based on the basic parameters;

The first transmission requirement information, derived from the data's basic parameters, includes bandwidth and rate requirements. The bandwidth requirement parameter specifies the frequency range needed for data transmission, while the rate requirement parameter indicates the necessary data transmission speed.

Different data types dictate different bandwidth and rate needs. For instance, video data generally demands high bandwidth and high transmission rates, while text data has relatively low requirements. The transmission rate can be calculated based on the data size and the intended transmission duration, enabling an optimized allocation of resources for various data types.

For each data type, standard parameters for bandwidth and rate requirements can be established. For example, video data might require 10 Mbps of bandwidth and a transmission rate of 30 Mbps, while audio data might require 1 Mbps of bandwidth and a 2 Mbps transmission rate.

Defining the transmission needs for each data type helps allocate resources effectively to ensure transmission quality and efficiency. By setting standard parameters, the calculation of transmission requirements is simplified, enhancing system adaptability and stability.

Step S13 of determining the second predetermined number based on bandwidth capacity of each monochromatic LED;

Bandwidth capacity refers to the frequency range a monochromatic LED can support. Each LED's bandwidth capacity is determined by its hardware characteristics and modulation technique. In an optical information transmission system, an LED's bandwidth capacity is a key indicator of the data rate it can support under specific modulation techniques. This capacity can be assessed using various preset modulation algorithms to find each LED's minimum and maximum bandwidth capacities.

In one implementation, the bandwidth capacity is the minimum capacity, meaning the system is designed to operate even under the least favorable conditions. This approach considers the LED's performance in challenging scenarios, ensuring the system always meets bandwidth needs. Using the minimum capacity simplifies system design and calculation, avoiding complex computations across modulation techniques and reducing risks of under-performance, thus enhancing system reliability and stability.

In another implementation, the bandwidth capacity is the average between minimum and maximum capacities, better reflecting the LED's typical performance under different modulation techniques. This method takes into account the average performance, enabling better resource planning and utilization, which boosts system efficiency. It also balances performance and cost, preventing overdesign while meeting real-world bandwidth requirements.

The choice between minimum or average bandwidth capacity depends on specific system needs and design objectives. In practice, this decision may be flexible to balance stability, predictive accuracy, and resource optimization.

After obtaining each LED's bandwidth capacity, the total system bandwidth requirement is compared and matched with the combined bandwidth capacities of the LEDs. A sufficient number of LEDs are selected so that their total bandwidth capacity meets or exceeds the system's total requirement.

The LED count determined in Step S13 optimizes spectral resources, ensuring the bandwidth demands are met on the physical level. This design approach maximizes performance while minimizing energy use and resource wastage.

Step S14: performing data segmentation on the data to be transmitted based on data type and the second predetermined number;

Finally, the data to be transmitted is divided into multiple segments, each termed a data fragment. Different data types use tailored segmentation strategies: for example, video data may be divided by frames, audio data by time slices, and text data by paragraphs or character counts. Segmentation simplifies data management and transmission, enhancing flexibility and efficiency in the transmission process.

Step S2 of determining a second predetermined number of target monochromatic LEDs according to light emission characteristics of the monochromatic LEDs and the first transmission requirement information;

Specifically, the emission characteristics parameters include the light source's wavelength, light intensity, frequency response characteristics, bandwidth, modulation efficiency, etc. The target monochromatic LEDs are the light sources used to transmit specific data fragments, and their characteristics are matched with the transmission requirements of the data fragments. By matching the characteristics of the monochromatic LEDs with the data transmission demands, the most suitable light sources are selected to optimize data transmission. This matching of characteristics and demands ensures that each data fragment is transmitted through the most appropriate light source, improving transmission efficiency and stability.

the step of determining a second predetermined number of target monochromatic LEDs according to light emission characteristics of the monochromatic LEDs and the first transmission requirement information comprises:

Step S21 of determining second transmission requirement information for each data fragment according to the first transmission requirement information, wherein the first transmission requirement information includes bandwidth and rate requirement parameters, Specifically, based on the characteristics of the data to be transmitted and the transmission requirements, the specific transmission requirements for each data fragment are determined. These requirements will be used in subsequent steps, especially during the selection of the appropriate monochromatic LEDs. By considering data type and transmission demand information (such as bandwidth and rate requirements), the specific transmission requirements for each data fragment are calculated. This ensures that the system has accurate data transmission demand information when selecting target monochromatic LEDs. By accurately obtaining and defining the second transmission demand information, the selection of unsuitable monochromatic LEDs can be avoided, thus improving the transmission efficiency and reliability of the system. This precise demand definition helps optimize the design and implementation process of the optical communication system.

Step S22 of selecting the monochromatic LEDs according to the second transmission requirement information to obtain candidate monochromatic LEDs, wherein a number of the candidate monochromatic LEDs is greater than or equal to the second predetermined number and less than or equal to the first predetermined number;

Specifically, the candidate monochromatic LEDs are selected from the first predetermined number of monochromatic LEDs, under the condition that they meet the second transmission demand information. By screening the candidate monochromatic LEDs, it ensures that these light sources can theoretically support the transmission requirements of the system. Based on the second transmission demand information, the bandwidth capacity and other characteristics of each monochromatic LED are evaluated, and those that meet the requirements are selected as candidate monochromatic LEDs. This step ensures that the target monochromatic LEDs chosen later can effectively perform the optical information transmission task in practical applications.

By accurately screening the candidate monochromatic LEDs, it is ensured that the selected target monochromatic LEDs possess the required transmission capacity while minimizing resource waste in the system. This screening process helps optimize system performance and resource utilization, thereby enhancing the overall optical information transmission.

Step S23 of when the number of candidate monochromatic LEDs exceeds the second predetermined number, determining the second predetermined number of candidate monochromatic LEDs as target monochromatic LEDs according to the light emission characteristics of the candidate monochromatic LEDs;

When the number of candidate monochromatic LEDs exceeds the second preset number, it is necessary to select the most suitable monochromatic LED based on more detailed emission characteristic parameters and technical capabilities to ensure optimal system performance. For the candidate monochromatic LEDs exceeding the preset number, the most suitable target monochromatic LED is determined by comparing their emission characteristic parameters (such as spectral distribution, light intensity, modulation support capability, etc.).

In an embodiment of the present disclosure, the step of when the number of candidate monochromatic LEDs exceeds the second predetermined number, determining the second predetermined number of candidate monochromatic LEDs as target monochromatic LEDs according to the light emission characteristics of the candidate monochromatic LEDs comprises:

Step S231 of obtaining a light emission characteristic parameter of each candidate monochromatic LED, wherein the light emission characteristic parameter includes: emission wavelength, spectral width, and light intensity;

Specifically, collecting and recording the light emission characteristic parameters of each candidate monochromatic LED. These parameters will be used in subsequent steps for evaluation and ranking to select the most suitable target monochromatic LED. For each candidate monochromatic LED, measure or use equipment to obtain its emission wavelength, spectral width, and light intensity parameters. This may involve using spectrometers, photometers, or other optical measurement devices to acquire accurate data.

Emission Wavelength refers to the wavelength of the light emitted by the monochromatic LED, typically measured in nanometers (nm).

Spectral width refers to the distribution range of the emission wavelength of the monochromatic LED. A narrower spectral width indicates that the wavelength is concentrated within a smaller range.

Light intensity refers to the power of light emitted by the monochromatic LED per unit area per unit time.

Step S232 of obtaining a visual acuity function value of each candidate monochromatic LED according to the emission wavelength and a visual acuity function, Specifically, the visual acuity function refers to the human eye's sensitivity to light of different wavelengths. The visual acuity function describes the relative sensitivity of the human eye to various wavelengths. For example, the human eye is most sensitive to light at a wavelength of 555 nm, where the visual acuity function value is higher.

Based on the emission wavelengths of the candidate monochromatic LEDs, their visual acuity function values are calculated in relation to human vision. This is an important basis for assessing the degree of interference each monochromatic LED might cause to the human eye.

Using a known visual acuity function (such as the CIE standard acuity function) and the emission wavelengths of the candidate monochromatic LEDs, the visual acuity function value for each candidate LED is calculated. This can be accomplished using mathematical models or specific software.

Step S233 of determining an eye interference index for each candidate monochromatic LED based on the visual acuity function value, emission wavelength, spectral width, and light intensity, wherein the eye interference index is positively correlated with the sensitivity function value and light intensity, and negatively correlated with the spectral width and light intensity, Specifically, the eye interference index is an indicator used to quantify the degree of interference that a monochromatic LED causes to human visual perception. A higher interference index indicates a more noticeable interference from the light source on human vision.

The visual acuity function value describes the human eye's sensitivity to light of different wavelengths. Monochromatic LEDs with high visual acuity function values imply that the human eye is more sensitive to them. Therefore, to reduce interference perceived by the human eye, monochromatic LEDs with lower visual sensitivity function values are preferred. The spectral width describes the wavelength range within which the monochromatic LED emits light. A narrower spectral width means the emission wavelength is concentrated within a smaller range, causing less interference to human vision. Light intensity describes the strength of light emitted by the monochromatic LED. Lower light intensity may reduce direct interference with human vision.

By considering these factors, setting the eye interference index to be positively correlated with the visual sensitivity function value prioritizes monochromatic LEDs with lower visibility to the human eye, while setting it to be negatively correlated with spectral width and light intensity minimizes interference from the light source on human vision as much as possible. This configuration can effectively optimize the performance of the optical information transmission system and enhance the user experience.

And step 234 of sorting the candidate monochromatic LEDs in descending order of the eye interference index, and selecting the top second predetermined number of candidate monochromatic LEDs as the target monochromatic LEDs.

Specifically, when determining the target monochromatic LEDs, light sources with minimal interference to human vision are prioritized to reduce perceptual interference during optical information transmission. The candidate monochromatic LEDs are ranked in order of interference degree based on the Human Eye Interference Index, from high to low. Based on the calculated Human Eye Interference Index values, the candidate monochromatic LEDs are sorted in descending order. The top-ranked LEDs up to the second predetermined number are selected as the target monochromatic LEDs. This process can be implemented through programming algorithms or manual sorting methods.

Step S24 of when the number of candidate monochromatic LEDs is equal to the second predetermined number, assigning the candidate monochromatic LEDs as target monochromatic LEDs.

When the number of candidate monochromatic LEDs precisely matches the second predetermined number, the system directly uses these monochromatic LEDs as the target, eliminating the need for further screening or selection.

Step S3 of processing corresponding data fragments for each target monochromatic LED according to a preset modulation algorithm corresponding to each monochromatic LED, thereby generating respective light source control signals, Specifically, a preset modulation algorithm refers to the algorithm used for signal modulation, such as Pulse Position Modulation (PPM) or Orthogonal Frequency Division Multiplexing (OFDM). The light source control signal is a signal controlling the emission characteristics of the light source, facilitating the optical information transmission of the data segments.

This step involves modulating the data segments, converting them into a signal format suitable for light source transmission to generate the light source control signals. First, the modulation algorithm best suited to the frequency response characteristics and transmission requirements of each target monochromatic LED is selected. The data segments are processed according to the modulation algorithm, generating corresponding modulation signals. The modulation signals are then converted into light source control signals, which control the emission characteristics (such as frequency, intensity, and waveform) of the light source to achieve optical information transmission of the data.

By selecting an appropriate modulation algorithm, data transmission efficiency and reliability can be improved. The light source control signals enable precise control of the light source's emission characteristics, ensuring high-quality and low-interference data segment transmission in optical information transfer.

As a preferred embodiment of the present disclosure, the step of processing corresponding data fragments for each target monochromatic LED according to a preset modulation algorithm corresponding to each monochromatic LED, thereby generating respective light source control signals comprises:

Step S31 of establishing a mapping relationship between each target monochromatic LED and the respective data segments based on the frequency response characteristics of the target monochromatic LEDs and the second transmission requirement information.

Specifically, each monochromatic LED has a unique frequency response characteristic, indicating the frequency range and efficiency at which it can respond and transmit. The second transmission requirement information is defined according to the properties and target requirements of the data to be transmitted, including bandwidth requirements, transmission rate, etc. This information determines the number of monochromatic LEDs needed to transmit the data. Based on the frequency response characteristics of the target monochromatic LEDs and the second transmission requirement information, determine which monochromatic LEDs are allocated to each data segment.

Correctly establishing the mapping relationship between the target monochromatic LEDs and data segments maximizes the efficiency and reliability of optical information transmission. By fully utilizing the frequency response characteristics of the monochromatic LEDs and applying an appropriate modulation algorithm, the data transmission process can be optimized, ensuring accuracy and real-time performance in data transmission.

Preferably the step of establishing a mapping relationship between each target monochromatic LED and the respective data segments based on the frequency response characteristics of the target monochromatic LEDs and the second transmission requirement information comprises:

Step S311 of obtaining frequency response characteristics of each target monochromatic LED, wherein the frequency response characteristics include: operating frequency range, bandwidth capacity, modulation efficiency, and maximum transmission rate;

The purpose of this step is to gather and understand the frequency response characteristics data for each target monochromatic LED. This data will be used in subsequent steps, particularly in selecting the appropriate modulation algorithm and determining the allocation of data segments. The frequency response characteristics of each target monochromatic LED can be obtained through experimental measurement or from manufacturer-provided specification sheets. Key parameters such as operating frequency range, source bandwidth, modulation efficiency, and maximum transmission rate typically vary according to the physical structure and material properties of the light source.

Determining the frequency response characteristics of each monochromatic LED helps in selecting the most suitable light source for specific data transmission requirements. For instance, high bandwidth and modulation efficiency can support higher data rates, while a broader operating frequency range allows for adaptability to various application scenarios, thereby enhancing system flexibility and reliability.

Step S312 of obtaining second transmission requirement information for each data fragment, wherein the second transmission requirement information includes: data fragment bandwidth requirement, data fragment rate requirement, and priority, The purpose of this step is to determine the transmission requirements for each data segment, including bandwidth, rate, and their priority order. This information will guide the selection of appropriate light sources and modulation algorithms to achieve optimal data transmission. By obtaining the specific transmission requirements for each data segment, the system can match suitable monochromatic LEDs and modulation algorithms according to these needs, thereby enabling efficient resource utilization and optimized data transmission. Priority information ensures that high-priority data segments receive sufficient bandwidth and rate support during transmission, thus enhancing overall system performance and responsiveness.

Step S313 of calculating a difference between the bandwidth capacity of each target monochromatic LED and the bandwidth requirement of each corresponding data fragment, referred to as a first difference value;

Specifically, evaluate whether the bandwidth capacity of each target monochromatic LED sufficiently meets the bandwidth requirements of the data segment. The calculated first difference reflects the potential matching degree of each monochromatic LED in terms of bandwidth. For each target monochromatic LED, first determine its bandwidth capacity, then compare it to the bandwidth requirement of each data segment. The first difference is calculated by subtracting the data segment's bandwidth requirement from the LED's bandwidth capacity. Calculating the first difference enables rapid identification of which monochromatic LEDs can potentially satisfy the bandwidth requirements of data segments, aiding in precise matching of light sources to data segments and improving the system's transmission efficiency and performance.

Step S314 of calculating a difference between the maximum transmission rate of each target monochromatic LED and the data fragment rate requirement of each corresponding data fragment, referred to as a second difference value;

The purpose of this step is to evaluate the matching ability of each target monochromatic LED in terms of transmission rate. The result of the second difference value reflects the potential matching degree of each monochromatic LED in terms of rate requirements. For each target monochromatic LED, determine its maximum transmission rate and compare it with the rate requirement of each data segment. The second difference value is calculated by subtracting the data segment's rate requirement from the maximum transmission rate. By calculating the second difference, it is possible to quickly identify which monochromatic LEDs can meet the rate requirements of the data segments. This helps to avoid selecting light sources with insufficient transmission rate, thus improving the stability and reliability of data transmission.

Step S315 of establishing an initial matching list for each data fragment according to the first difference value and second difference value, wherein the initial matching list includes several target monochromatic LEDs that meet a preset transmission condition, and the preset transmission condition includes: the first difference value being greater than or equal to a first difference threshold and the second difference value being greater than or equal to a second difference threshold;

Specifically, based on the calculated first difference value and second difference value, target monochromatic LEDs are filtered out that meet both the bandwidth capacity and maximum transmission rate requirements of the data segments. The initial matching list includes several target monochromatic LEDs that satisfy the preset transmission conditions. The preset transmission conditions include that the first difference value is greater than or equal to the first difference threshold and that the second difference value is greater than or equal to the second difference threshold.

Setting the threshold for the first difference value ensures that the selected monochromatic LED has sufficient bandwidth to support the data segment's transmission requirements. Generally, if the first difference value is greater than or equal to a certain threshold, it indicates that the bandwidth capacity of the light source is adequate or even exceeds the data segment's bandwidth demand, thus ensuring that bandwidth shortages do not occur.

Setting the threshold for the second difference value ensures that the selected monochromatic LED's transmission rate is sufficient to meet the data segment's rate requirements. This difference value must be greater than or equal to a predefined threshold to ensure that the light source does not create bottlenecks due to insufficient rate during actual transmission.

Each data segment has its own initial matching list, which is based on technical calculations. Establishing the initial matching list helps the system quickly filter out the best choices from a large pool of possible monochromatic LEDs, saving computational resources and time while ensuring the quality and efficiency of the data segment's transmission.

Step S316 of sorting each initial matching list in ascending order according to a weighted calculation of the first difference value and the second difference value;

Specifically, for the initial matching list of each data segment, a weighted score is calculated (typically a linear combination of the first difference value and the second difference value), and then the target monochromatic LEDs are sorted in ascending order based on these scores. Sorting the initial matching list helps the system prioritize the monochromatic LEDs that are most suitable in terms of both bandwidth and rate, thus optimizing the selection of data transmission and resource utilization.

Step S317 of when duplicate target monochromatic LEDs exist in the initial matching lists, removing the duplicate target monochromatic LED based on the priority;

Specifically, when the same monochromatic LED is found in the initial matching lists of multiple data segments, the duplicate light sources are removed, and the highest-scoring light source from each data segment is retained according to its priority order. Removing duplicate target monochromatic LEDs ensures that the final selected light sources are the optimal choices, avoiding resource wastage and conflicts, while also improving the stability and reliability of data transmission.

Step S318 of establishing a mapping relationship between the data fragment and the first target monochromatic LED in the corresponding initial matching list;

For each data segment, the monochromatic LED ranked first in its sorted initial matching list is selected as the final choice, and the mapping relationship between the selected LED and the data segment is established. Establishing the mapping relationship between the data segment and the top-ranked light source in the initial matching list can accelerate the system's response and processing of the data segment, ensuring that each data segment receives the best transmission support, thereby optimizing the system's performance and efficiency.

Step S32 of determining a target modulation algorithm according to the second transmission requirement information of the data fragment, the frequency response characteristics of the corresponding target monochromatic LED, and preset modulation algorithm, wherein the preset modulation algorithms include: PPM modulation algorithm, PAM modulation algorithm, QAM modulation algorithm, and OFDM modulation algorithm;

The PPM modulation algorithm transmits information by the time position of pulses, the PAM modulation algorithm transmits information by varying the amplitude of the pulses, the QAM modulation algorithm transmits multiple bits of data through a combination of amplitude and phase, and the OFDM modulation algorithm divides data segments into multiple subcarriers for parallel transmission, improving spectrum utilization.

Based on the second transmission requirement information of each data segment (such as transmission rate, signal-to-noise ratio requirements), and considering the frequency response characteristics of the target monochromatic LED, an appropriate preset modulation algorithm is selected. The modulation technology suited to the target monochromatic LED's frequency response characteristics is analyzed, and the best modulation method is determined based on the transmission requirement information of each data segment. For example, for data segments requiring high-speed transmission and a high signal-to-noise ratio, the QAM or OFDM modulation algorithm may be chosen.

In a preferred embodiment of the present disclosure, the step of determining a target modulation algorithm according to the second transmission requirement information of the data fragment, the frequency response characteristics of the corresponding target monochromatic LED, and preset modulation algorithm comprises:

Step S321 of assigning several preset modulation algorithms that satisfy the corresponding second transmission requirement information for each data fragment based on the frequency response characteristics of the corresponding target monochromatic LED, referred to as the first intermediate modulation algorithms;

The purpose of this step is to select the appropriate modulation algorithm for each data segment based on its transmission requirements and the frequency response characteristics of the target monochromatic LED. For each data segment, its transmission requirements are analyzed, and then, based on the frequency response characteristics of the target monochromatic LED, a preset modulation algorithm is chosen that can most effectively utilize the light source characteristics and meet the transmission needs of the data segment.

Step S322 of obtaining an estimated optical pulse frequency of the data fragment after modulation by the corresponding first intermediate modulation algorithm;

Specifically, the estimated optical pulse frequency refers to the frequency of the optical signal generated after modulation, which is the basic frequency characteristic of the light signal after the data segment is converted. For each data segment, the chosen first intermediate modulation algorithm is applied to calculate the estimated optical pulse frequency. For example, but not limited to, in the case of the PPM modulation algorithm, the optical pulse frequency is equal to the data rate multiplied by the number of pulse positions. In PAM, the optical pulse frequency is equal to the data rate. In QAM, the optical pulse frequency is equal to the data rate multiplied by the number of symbols. In OFDM, the optical pulse frequency is equal to the data rate multiplied by the number of subcarriers. The estimation of the optical pulse frequency helps system designers understand the characteristics of each data segment's optical signal after modulation, thereby optimizing the optical transmission efficiency and performance of the system.

Step S323 of obtaining corresponding critical flicker frequency according to the emission wavelength of each target monochromatic LED;

Specifically, the critical flicker fusion frequency (CFF) varies with different wavelengths of light. The critical flicker fusion frequency refers to the frequency at which the human eye can no longer perceive the flicker of a light source and perceives it as a continuous light. Short-wavelength light has higher visual sensitivity, so the human eye can more easily detect flicker in blue light, requiring a higher frequency to reach an imperceptible state. In contrast, the visual sensitivity of the human eye to long-wavelength light is lower, meaning that flicker in red and infrared light can occur at lower frequencies while still achieving imperceptibility. When selecting modulation algorithms and light sources, it is necessary to consider the impact of the light source's wavelength on CFF to ensure that communication is imperceptible to the human eye.

Step S324 of filtering the first intermediate modulation algorithms for each data fragment based on the critical flicker frequency and the estimated optical pulse frequency to obtain several second intermediate modulation algorithms;

Specifically, compare the estimated optical pulse frequency with the critical flicker fusion frequency (CFF) of the target monochrome LED. If the estimated frequency is greater than the CFF, the current first intermediate modulation algorithm is considered acceptable and is referred to as the second intermediate modulation algorithm. By screening the second intermediate modulation algorithm, the system can optimize the selection of the most suitable modulation algorithm based on the light source's emission characteristics and the expected optical pulse frequency.

In optically-carried information transmission systems, users generally expect efficient data transmission while maintaining a moderate light intensity. Selecting modulation algorithms where the estimated frequency exceeds the CFF can effectively reduce or eliminate perceptible flicker for the human eye, thereby enhancing user experience. In practical applications, choosing modulation algorithms that ensure light source stability without causing eye discomfort is particularly important for fields such as optical communication and display technology. This selection not only meets technical performance requirements but also enhances the broad applicability and acceptability of the technology.

Step S325 of determining the target modulation algorithm for each data fragment according to the second intermediate modulation algorithm.

For each data segment, based on the second intermediate modulation algorithm list filtered in step S324, evaluate its applicability under the light source's emission wavelength and optical pulse frequency conditions. Each second intermediate modulation algorithm has specific modulation methods and frequency characteristics, making them suitable for different light sources and transmission conditions. Based on practical requirements and system design objectives, select the optimal second intermediate modulation algorithm as the target modulation algorithm for each data segment. In determining the target modulation algorithm, factors such as modulation efficiency, noise immunity, and frequency utilization should be comprehensively considered to ensure that the expected data transmission quality is achieved in optical information transmission.

Step S33 of encoding and modulating the data fragment by corresponding target modulation algorithm, thereby generating respective light source control signals.

Convert the to-be transmitted digital data segments to a signal format that conforms to the requirements of the selected modulation algorithm. For example, in QAM modulation, the data segment is divided into symbols, with each symbol representing a combination of multiple bits. The encoded data is then mapped to a signal form that the light source can handle. The modulated light source control signal can directly drive the monochrome LED for optical information transmission. The control signals generated by different modulation algorithms may vary in frequency, amplitude, and phase, depending on the selected modulation technique and the nature of the data segment.

Step S4 of controlling the target monochromatic LEDs to perform optically-carried information transmission according to the light source control signals.

Specifically, the light source control signal is input into the corresponding light source driver circuit. The driver circuit adjusts the light source's emission characteristics based on the control signal to carry out optical information transmission. It ensures that the emission characteristics of the light source (such as frequency, intensity, etc.) meet the preset transmission requirements, guaranteeing the quality of data transmission. Through data segmentation, light source matching, modulation processing, and controlled emission, efficient optical information transmission using a full-spectrum light source can be achieved. Each step is carefully explained and optimized based on specific technical features, significantly enhancing the efficiency, stability, and concealment of the entire system for data transmission.

In a preferred embodiment of the present disclosure, the step of controlling the target monochromatic LEDs to perform optically-carried information transmission according to the light source control signals comprises:

Step S41 of acquiring an ambient light parameter, where the ambient light parameters include ambient light intensity and ambient spectral distribution;

Specifically, ambient light intensity represents the level of light intensity in a specific environment, while ambient spectral distribution describes the distribution of light across different wavelengths, covering the range from ultraviolet to infrared. This step involves obtaining optical characteristic data from the environment, which is crucial for adjusting the light source control signals to adapt to the current environmental conditions. Ambient lighting parameters influence the selection and setup of light sources in the optical information transmission system.

According to the specific application scenario, data on ambient light intensity and spectral distribution can be obtained using sensors or measurement devices. Ambient light intensity can be measured with light sensors, providing a numerical representation of the light intensity level. Ambient spectral distribution can be obtained using spectrometers or spectral measurement equipment, which reveals the distribution of light across different wavelengths in the environment.

Step S42 of when the first predetermined number equals the second predetermined number, adjusting each light source control signal according to the ambient light intensity, ambient spectral distribution, and the preset filtering algorithm to obtain a first target control signal;

The preset filtering algorithm is designed to adjust the light source control signals to meet specific transmission requirements, typically involving signal filtering and parameter adjustments. When the first predetermined number equals the second predetermined number, it indicates that the number of available light sources matches the expected number, meaning no additional light sources are needed. At this point, based on the ambient light parameters (light intensity and spectral distribution) and the preset filtering algorithm, the light source control signals are adjusted to ensure that the generated communication light pulses align as closely as possible with the spectral and intensity characteristics of the ambient light. This adjustment process can include:

Brightness Adjustment: The light source brightness is adjusted based on the ambient light intensity to maintain a balance with the surrounding light. This helps prevent interference due to spectral overlap.

Frequency Adjustment: The light source's working frequency is adjusted according to its preset frequency range and the spectral distribution of the environment. This adjustment aims to avoid spectral overlap and interference.

Waveform Adjustment: The waveform of the light source is adjusted according to the specific shape of the ambient light spectrum. This can include changes to pulse width, pulse interval, and other characteristics to ensure that the generated communication light pulses match the ambient light spectrum as closely as possible.

Step S43 of according to the first target control signal, controlling the corresponding target monochromatic LEDs to perform optically-carried information based on;

The first target control signal is the adjusted signal generated from the previous steps. It contains the relevant parameters of the optically-carried information to be transmitted, such as frequency, intensity, and waveform. This control signal is then applied to the target monochrome LED, which modifies the light source's characteristics—such as light intensity, frequency, and phase—in order to carry the required information on the optical carrier.

By adjusting these characteristics according to the modulation signal, light pulses are generated, ensuring that the optical carrier signal effectively carries the data to be transmitted. The result is that the modulation of the light source is accurately controlled, enabling reliable and efficient light-based data transmission.

Step S44 of when the first predetermined number is greater than the second predetermined number, adjusting each light source control signals for according to the ambient light parameters, preset filtering algorithm, and preset light emission intensity to obtain a first target control signal;

Specifically, this step is similar to step S42, and will not be elaborated further here;

Step S45 of acquiring the second target control signal for unused monochromatic LEDs based on the first target control signal, the environmental lighting parameters, and the preset emission intensity;

When the first preset quantity is greater than the second preset quantity, there may be multiple available but unused monochromatic LEDs. The control signals for these unused LEDs are calculated and obtained based on the first target control signal, environmental lighting parameters, and preset emission intensity. These control signals are designed to supplement or enhance the performance of the current transmission system.

Preferably, the step of acquiring the second target control signal for unused monochromatic LEDs based on the first target control signal, the environmental lighting parameters, and the preset emission intensity comprises:

Step S451 of acquiring a first actual light emission intensity for each target monochromatic LED based on the first target control signal;

Based on the first target control signal, the system obtains the current first actual emission intensity for each target monochromatic LED. This includes parameters such as the current brightness, frequency, phase, etc., which are adjusted through the control signal to meet communication requirements and environmental conditions.

Step S452 of acquiring a supplementary light emission intensity according to the first actual light emission intensity, the preset light emission intensity, and the ambient light intensity;

Specifically, the system predefines the target emission intensity level that each light source should achieve in a specific communication environment. At the same time, the environmental light intensity provides a reference for the background light intensity in the current environment. Based on the difference between the first actual emission intensity and the preset emission intensity, along with the impact of the environmental light intensity, the system calculates the additional emission intensity required. This process ensures that each light source, while making full use of the environmental conditions, can still meet the emission intensity needed for communication.

Step S453 of calculating a total target light emission intensity for the monochromatic LEDs other than the target monochromatic LEDs according to the supplementary light emission intensity;

Based on the required supplemental emission intensity, the system evaluates other available monochrome LEDs aside from the target LEDs. The system may consider unused light sources and assess their emission characteristics and availability.

Step S454 of determining target light emission intensity for each monochromatic LED other than the target monochromatic LEDs according to the total target light emission intensities and the ambient spectral distribution;

Based on the environmental spectral distribution and the characteristics of each unused monochrome LED, the system determines the specific emission intensity that each LED needs to achieve. These target emission intensities are designed to match the spectral characteristics of the current environment, thereby maximizing the effectiveness of information transmission.

Through the above steps, the system is able to dynamically adjust the control signals of unused monochrome LEDs based on the actual environmental conditions, optimizing the transmission of optically-carried information. This real-time adjustment and optimization ensure that the optical communication system operates efficiently and stably under various environmental conditions.

Step S455 of generating second target control signals for all unused monochromatic LEDs based on the target light emission intensity;

Finally, based on the target light intensity, the second target control signals for all unused monochrome LEDs are obtained. This allows the system to dynamically adjust the control signals of unused monochrome LEDs according to the actual environmental conditions, optimizing the transmission of optically-carried information. This real-time adjustment and optimization ensure that the optical communication system remains efficient and stable across different environmental conditions.

Step S46 of controlling the corresponding monochromatic LEDs to optically-carried information transmission according to the first target control signals and the second target control signals.

In steps S44 and S45, the system has determined the first target control signal and the second target control signal. The first target control signal is used for the monochromatic LEDs that have been identified for data transmission, while the second target control signal is for supplementary control to utilize unused monochromatic LEDs. Based on the guidance of the first and second target control signals, the system adjusts the light intensity, frequency, or waveform of the corresponding monochrome LEDs to ensure that the optically-carried information transmission occurs under the expected spectral and intensity conditions.

In practical applications, the system may continuously monitor the environmental lighting parameters and the effectiveness of optical information transmission. Based on this information, the system can dynamically adjust the first and second target control signals to adapt to environmental changes or optimize the transmission performance.

Preferably, referring to FIG. 3 after the step of controlling the target monochromatic LEDs to perform optically-carried information transmission according to the light source control signals, the method further comprises:

Step S5 of monitoring qualities of information transmission in real-time to obtain communication quality monitoring results of each target monochromatic LED, wherein the communication quality monitoring results include signal strength, error rate, and transmission delay;

Specifically, sensors or detectors are used to monitor the signal characteristics of each target monochromatic LED in real-time, including the intensity of the emitted light signal, error rates, and information transmission delay. Signal strength refers to the intensity or power of the light signal. The stronger the signal, the better the stability and anti-interference capability of the information transmission. Error rate refers to the proportion of incorrectly received bits to the total number of received bits during transmission. A lower error rate indicates higher accuracy in information transmission. Transmission delay refers to the time required for information to travel from the sender to the receiver. The shorter the delay, the better the timeliness of the communication.

By monitoring the transmission quality in real time, potential issues in the information transmission process—such as signal strength decline, increased error rate, or increased transmission delay—can be detected promptly. This allows for adjustments or switching before the issues worsen, maintaining the communication performance and stability of the system.

Step S6 of when the signal strength of one target monochromatic LED is below the preset signal strength threshold, and/or its error rate exceeds the preset error rate threshold, and/or its transmission delay exceeds the preset delay threshold, designating target monochromatic LED as an LED to be switched;

Specifically, a preset signal strength threshold is the minimum acceptable limit for signal strength that the system sets during operation. If the signal strength falls below this threshold, the system recognizes that the current light source's transmission performance is insufficient, and action is required. The preset error rate threshold indicates the maximum allowable error rate. Exceeding this limit means the data error rate is too high, greatly reducing transmission reliability. The preset delay threshold is the maximum acceptable time for transmission delay; exceeding this delay may compromise communication timeliness.

The system continuously compares the real-time monitored values of signal strength, error rate, and transmission delay against these preset thresholds. When any indicator fails to meet the threshold, the system marks the corresponding light source as an "LED to be switched" and begins preparing to switch to another light source to take over the transmission. This process effectively ensures that the system can respond promptly when transmission quality degrades, preventing data loss or communication interruptions due to prolonged low-quality transmission. By marking LEDs for switching in advance, the system can perform the transition before issues worsen, thereby maintaining stable overall communication performance.

Step S7 of determining at least one monochromatic LED as a target switch LED based on the data fragment corresponding to the LED to be switched;

Specifically, the system first analyzes the data segment handled by the LED to be switched to identify its specific transmission requirements, including bandwidth, rate, and priority. Based on these needs, the system filters available, unused light sources that can meet these requirements to serve as backup target switch LED. If all light sources are already in use, the system further examines the load status of the active light sources, selecting the one with a lighter load and characteristics compatible with the data segment as the target switch LED.

Step S8 of controlling the target switch LED to transmit the data fragments corresponding to the LED to be switched according to a preset light source switching rule;

Specifically, the predefined light source switching rules are a set of guidelines or strategies that the system follows when switching LEDs. These rules may take into account factors such as the data segment split ratio, switching time, switching priority, and light source utilization efficiency.

As a preferred embodiment of the present disclosure, the step of determining at least one monochromatic LED as a target switch LED based on the data fragment corresponding to the LED to be switched comprises:

Step S71 of acquiring the second transmission requirement information for the data fragment corresponding to the LED to be switched, wherein the second transmission requirement information includes: data fragment bandwidth requirement, data fragment rate requirement, and priority;

Specifically, the second transmission requirement information refers to the transmission conditions that must be met by the LED to be switched. This includes bandwidth requirements (the frequency bandwidth needed for data transmission), rate requirements (the amount of data transmitted per unit of time), and priority. Accurately obtaining this transmission requirement information ensures that, during LED switching, the selected target light source can meet the current data segment's transmission needs, thereby maintaining continuity and quality in data transmission.

Step S72 of caching the data fragment corresponding to the LED to be switched to obtain a cached data fragment;

Specifically, the data segments from the LED to be switched are temporarily stored in a buffer to prevent interruptions during the switching process. This buffering mechanism ensures that data segments are neither lost nor delayed due to the switching process, significantly enhancing system reliability.

Step S73 of when the second predetermined number is less than the first predetermined number, acquiring the monochromatic LEDs other than the target monochromatic LED as first backup switch LEDs;

Specifically, when the second predetermined number is less than the first predetermined number, it indicates that there are still unused light source resources in the current system. The system selects potential replacement sources from these unused light sources to broaden the options for source switching. These unused sources (namely non-target monochromatic LEDs) are marked as "first backup switch LEDs." By leveraging unused light source resources, the system increases flexibility and success rates for source switching, reducing the risk of switching failures.

Step S74 of obtaining wavelength similarities between the emission wavelength of each first backup switch LED and the emission wavelength of the LED to be switched;

Specifically, wavelength similarity refers to the degree of similarity between the emission wavelength of a candidate light source and that of the LED being switched. The higher the wavelength similarity, the closer the spectral characteristics of the two sources, resulting in more consistent performance after switching. Based on this similarity, the system can prioritize light sources with closer wavelengths to ensure that the transmission characteristics remain as consistent as possible after switching. Choosing a light source with similar wavelengths helps maintain uniformity in color, brightness, and other factors, which supports consistent transmission quality and visual effect.

Step S75 of selecting the first backup switch LED that meets a preset switching condition as a target switch LED according to the wavelength similarity, the second transmission requirement information, and the frequency response characteristics of each first backup switch LED;

Specifically, the step first involves ranking candidate light sources based on wavelength similarity. Then, based on the second transmission requirement information, light sources that meet the bandwidth and rate requirements are further filtered. Finally, considering each candidate's frequency response characteristics, the system selects the light source that best meets the predefined criteria as the target switch LED. Through this multi-dimensional screening, the system identifies the optimal replacement source, ensuring that the data transmission performance is maintained after switching, preventing performance degradation.

In one embodiment, the preset switching conditions include the following: the wavelength similarity must meet or exceed a certain threshold; and/or the bandwidth capacity must be greater than or equal to the bandwidth requirement of the data segment; and/or the maximum transmission rate must be greater than or equal to the rate requirement of the data segment. In a preferred embodiment, the target switch LED's maximum transmission rate should be at least 10% higher than the required rate, allowing a buffer to account for potential bandwidth fluctuations. This precaution helps prevent transmission quality deterioration due to insufficient bandwidth after switching. Similarly, having a buffer for the transmission rate ensures system stability.

Step S76 of when the second predetermined number equals the first predetermined number, acquiring bandwidth margin of the target monochromatic LEDs other than the LED to be switched based on the communication quality monitoring results;

The bandwidth margin refers to the portion of a light source's bandwidth that remains unused during data transmission. A larger bandwidth margin indicates that the light source has more unused transmission capacity. When all light sources are in use, the system assesses each source's bandwidth margin to identify those that can support additional data segments for source switching. Based on real-time communication quality monitoring results, the system calculates the actual bandwidth usage for each target monochromatic LED, determining its bandwidth margin.

Step S77 of obtaining several first backup switch LED combinations that satisfy the second transmission requirement information of the data fragment corresponding to the LED to be switched according to the bandwidth margin, wherein each first backup switch LED combination includes at least one target monochromatic LED other than the LED to be switched, and at least one target monochromatic LED differs between any two first backup switch LED combinations;

The "first backup switch LED combination" refers to a set composed of one or more target monochromatic LEDs working together to handle a data segment's transmission tasks. When light source resources are limited, combining different sources allows the system to meet data segment transmission requirements and improve resource utilization. Based on each target light source's bandwidth margin, the system groups multiple sources to form combinations capable of meeting the data segment's transmission needs collectively. Each light source combination contains at least one unique source from other combinations, ensuring diversity and providing a flexible selection range. Every combination meets the specified secondary transmission requirements. By creating these combinations, the system maximizes existing resources, prevents situations where a single source cannot fulfill data requirements, and enhances the system's overall transmission capacity and flexibility.

Step S78 of filtering to obtain several second backup switch LED combinations according to the frequency response characteristics of the target monochromatic LEDs in each first backup switch LED combination and the data fragment rate requirement of the data fragment corresponding to the LED to be switched;

By considering the frequency response characteristics of light source combinations and the data segment's rate requirements, the system selects the most suitable light source combination for the current data segment transmission, ensuring that the switched transmission rate meets the requirements. The system calculates the overall frequency response of the combination based on the frequency response characteristics of the sources in the first alternative switch LED combination. It then compares this with the data segment's rate requirements. The system filters out the light source combinations that meet the rate requirements and have optimal frequency response characteristics, forming the second backup switch LED combination.

Step S79 of calculating the redundancy degree for each second backup switch LED combination according to a weighted calculation of a redundancy light source amount and a redundancy bandwidth capacity for each second backup switch LED combination, wherein a weight of the redundancy light source amount is greater than a weight of the redundancy bandwidth capacity;

Specifically, redundancy refers to the degree of redundant configuration of light sources and bandwidth in the system. The system calculates the number of redundant light sources (i.e., light sources that are not fully utilized) and the redundant bandwidth capacity (i.e., unused bandwidth) in each second backup switch LED combination and performs a weighted calculation. Due to the higher importance of the number of redundant light sources to system stability compared to redundant bandwidth capacity, the system assigns a higher weight to the number of redundant light sources when calculating the redundancy.

Step 710 of selecting the second backup switch LED combination with the smallest redundancy degree to determine the target switch LED.

Specifically, a smaller redundancy means that the resource utilization efficiency is higher, and the combination is optimized in terms of resource allocation because it reduces unnecessary use of light sources and bandwidth. After selecting the combination with the smallest redundancy, the monochrome LEDs in the combination will be identified as the target switch LEDs. At this point, the system will allocate these light sources to transmit the data segments corresponding to the LED to be switched.

As a preferred embodiment of the present disclosure, the step of controlling the target switch LED to transmit the data fragments corresponding to the LED to be switched according to a preset light source switching rule comprises:

Step S81 of splitting the data fragment corresponding to the LED to be switched according to a preset data splitting ratio to obtain a first data fragment and a second data fragment; Specifically, the preset data splitting ratio refers to the proportion predetermined by the system for allocating data segments to different light sources for transmission. For example, 70% of the data segments are transmitted through the LED to be switched, and 30% through the target switch LED. During the switching process, the data segment is split into two parts, which are respectively allocated to the original light source and the new switch LED for transmission, ensuring continuous data transmission and testing the performance of the switch LED. By allocating part of the data segment to the target switch LED, the system can evaluate the performance of the light source to decide whether a full switch is performed.

Step S82 of controlling the LED to be switched to transmit the first data fragment and controlling the target switch LED to transmit the second data fragment according to the preset modulation algorithm;

Specifically, the first data segment is modulated according to the preset modulation algorithm corresponding to the LED to be switched, in order to transmit the first data segment. Simultaneously, the second data segment is encoded and modulated according to the preset encoding modulation algorithm corresponding to the target switch LED and transmitted. This ensures that both data segments, transmitted on different light sources, follow the encoding and modulation methods set by the system, guaranteeing the accuracy and effectiveness of the data transmission.

Step S83 of obtaining transmission quality of the second data fragment on the target switch LED at preset time intervals;

Specifically, a fixed time interval set by the system is used for periodically checking the quality of data segment transmission. This interval is used to regularly monitor the transmission performance of the target switch LED, ensuring that it can handle the transmission task of the data segments and providing data for subsequent decisions on whether further switching is necessary. The transmission quality refers to the performance metrics of the second data segment during transmission on the target switch LED, including signal strength, bit error rate, transmission delay, and other relevant indicators.

Step S84 of if the transmission quality meets the preset quality conditions, increasing the preset data splitting ratio by a preset incremental proportion, and returning to the step of splitting the data fragment corresponding to the LED to be switched according to a preset data splitting ratio to obtain a first data fragment and a second data fragment, until the data fragment of the LED to be switched is entirely transmitted through the target switch LED;

Specifically, the system first checks whether the transmission quality of the target switch LED meets the preset conditions. If the transmission quality meets the requirements, meaning that performance metrics such as signal strength, bit error rate, and transmission delay all meet the corresponding thresholds, the system will gradually increase the data segment allocation ratio for the target switch LED according to a preset incremental ratio. This process will be repeated until all the data segments from the switching LED are transferred to the target switch LED.

By incrementally increasing the data segment allocation ratio, the system ensures that the switching process proceeds smoothly and avoids interruptions in data transmission. This incremental switching method maximizes the utilization of the target switch LED's transmission capacity while ensuring the transmission quality is maintained.

Step S85 of when the data fragment of the LED to be switched is entirely transmitted through the target switch LED, acquiring current second actual emission intensities of each target monochromatic LED and the target switch monochromatic LED;

Specifically, when the data segments corresponding to the switching LED are fully transmitted through the target switch LED, indicating that the switching is complete, the system obtains the current actual luminous intensity of the target switch LED and related light sources through sensors or other detection methods, referred to as the second actual luminous intensity. Real-time monitoring of the actual luminous intensity helps to track the operating status of the light sources and promptly adjust light source parameters, ensuring optimal illumination and transmission quality.

Step S86 of obtaining a third light source control signal according to the second actual emission intensity, preset emission intensity, and ambient light intensity;

Specifically, by comprehensively evaluating various luminous intensity parameters, an optimized control signal is generated to adjust the luminous state of the switching LED, ensuring optimal illumination. This step can refer to steps S451-S455, and will not be elaborated further here.

Step S87 of controlling the LED to be switched for illumination according to the third light source control signal.

Finally, by generating the control signal, the actual luminous state of the light source is adjusted, ensuring that during or after the switch, the light source operates normally. This ensures that both communication and lighting effects are not affected. This dynamic adjustment method enhances the system's stability and adaptability, ensuring that the optimal operational state is maintained under varying environmental and load conditions.

Embodiment 2

Figure 4:
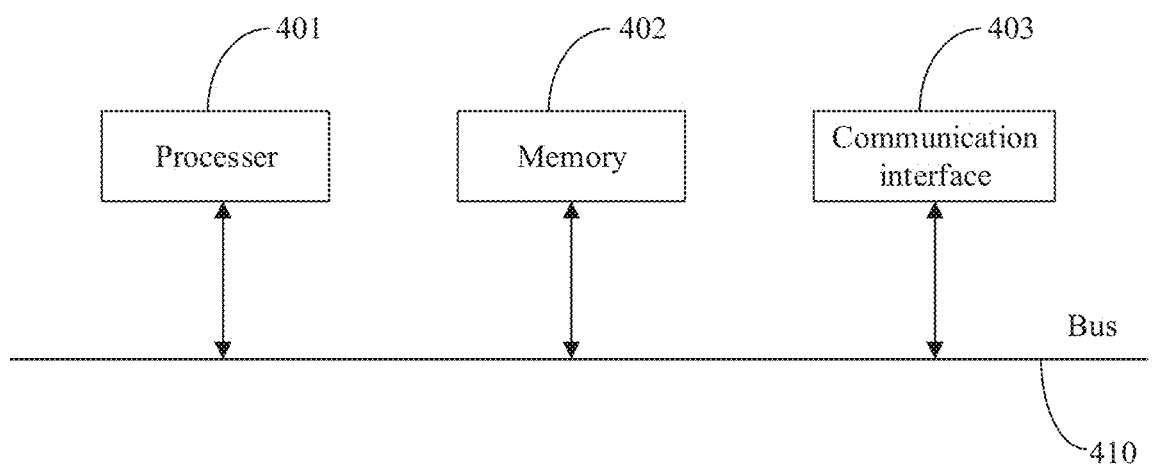
FIG. 4 is a structure diagram of a light source device of the embodiment of the present disclosure.

Additionally, the method for optically-carried information transmission based on full-spectrum LED, as described in the embodiment of the present invention shown in FIG. 1, can be implemented by a light source device. FIG. 4 illustrates a schematic diagram of the hardware structure of the light source device provided by the embodiment of the present invention.

The light source device may include a processor and a memory storing computer program instructions.

Specifically, the processor may include a central processing unit (CPU), an application-specific integrated circuit (ASIC), or may be configured to implement one or more integrated circuits of the embodiment of the present invention.

The memory may include high-capacity storage for data or instructions. For example, but not limited to, the memory may include a hard disk drive (HDD), floppy disk drive, flash memory, optical disk, magneto-optical disk, magnetic tape, or a Universal Serial Bus (USB) drive, or a combination of two or more of these. In appropriate circumstances, the memory may include removable or non-removable (or fixed) media. The memory may be located either inside or outside the data processing device, as appropriate. In certain embodiments, the memory is non-volatile solid-state memory. In specific embodiments, the memory includes read-only memory (ROM). In suitable cases, this ROM may be mask-programmed ROM, programmable ROM (PROM), erasable PROM (EPROM), electrically erasable PROM (EEPROM), electrically alterable ROM (EAROM), or flash memory, or a combination of two or more of these.

The processor reads and executes computer program instructions stored in the memory to implement any of the above-described method for optically-carried information transmission based on full-spectrum LED.

In one example, the light source device may also include a communication interface and a bus. As shown in FIG. 4, the processor 401, memory 402, and communication interface 403 are connected through the bus 410 to communicate with each other.

The communication interface is primarily used to enable communication between various modules, devices, units, and/or equipment in the embodiment of the present invention.

The bus includes hardware, software, or both, to couple the components of the light source device together. For example, but not limited to, the bus may include an Accelerated Graphics Port (AGP) or other graphics buses, Enhanced Industry Standard Architecture (EISA) bus, Front-Side Bus (FSB), HyperTransport (HT) interconnect, Industry Standard Architecture (ISA) bus, Infinite Bandwidth Interconnect, Low Pin Count (LPC) bus, memory bus, MicroChannel Architecture (MCA) bus, Peripheral Component Interconnect (PCI) bus, PCI-Express (PCI-X) bus, Serial Advanced Technology Attachment (SATA) bus, Video Electronics Standards Association Local (VLB) bus, or any other suitable bus, or a combination of two or more of these. In appropriate cases, the bus may include one or more buses. Although this embodiment describes and illustrates specific buses, the invention contemplates any suitable bus or interconnection.

Additionally, in conjunction with the method for optically-carried information transmission based on full-spectrum LED described in the above embodiments, an embodiment of the present invention provides a computer-readable storage medium to implement the method. The computer-readable storage medium stores computer program instructions, which, when executed by a processor, implement any of the method for optically-carried information transmission based on full-spectrum LED described in the above embodiments.

It should be noted that the present invention is not limited to the specific configurations and processes described above and illustrated in the figures. For simplicity, detailed descriptions of known methods have been omitted. The embodiments described above include several specific steps as examples. However, the method processes of the present invention are not limited to the specific steps described and illustrated. After understanding the spirit of the invention, those skilled in the art can make various changes, modifications, and additions, or alter the order of the steps.

The functional blocks shown in the structural block diagrams above can be implemented as hardware, software, firmware, or a combination thereof. When implemented in hardware, they may be, for example, electronic circuits, application-specific integrated circuits (ASICs), appropriate firmware, plug-ins, function cards, etc. When implemented in software, the elements of the present invention are programs or code segments used to perform the required tasks. The program or code segments can be stored in machine-readable media or transmitted over transmission media or communication links through data signals carried by a carrier. "Machine-readable media" can include any medium capable of storing or transmitting information. Examples of machine-readable media include electronic circuits, semiconductor memory devices, ROM, flash memory, erasable ROM (EROM), floppy disks, CD-ROMs, optical disks, hard disks, optical fiber media, radio frequency (RF) links, and so on. Code segments may be downloaded via computer networks such as the Internet or intranet.

It should also be noted that the exemplary embodiments referred to in this invention describe certain methods or systems based on a series of steps or devices. However, the present invention is not limited to the order of the steps described above. In other words, the steps can be executed in the order mentioned in the embodiments or in a different order, or several steps can be executed simultaneously.

The above descriptions are only specific embodiments of the present invention. Those skilled in the art will clearly understand that for convenience and simplicity, the specific working processes of the systems, modules, and units described above can be referenced to the corresponding processes in the method embodiments, and will not be repeated here. It should be understood that the scope of protection of the present invention is not limited to this. Any modifications or substitutions made by those skilled in the art within the technical scope disclosed by the present invention are considered equivalent and should be included within the scope of protection of the present invention.

What is claimed is:

1. A method for optically-carried information transmission based on full spectrum LED, which applied at a transmitting end, wherein the transmitting end comprises a full-spectrum semiconductor light-emitting device which comprises a first predetermined number of monochromatic LEDs with different emission wavelengths, an emission wavelength adjustment range of each monochromatic LED belongs to different wavelength intervals, the method comprises:

splitting data to be transmitted according to first transmission requirement information to obtain a second predetermined number of data fragments, wherein the second predetermined number is less than or equal to the first predetermined number, determining the second predetermined number of target monochromatic LEDs according to light emission characteristics of the monochromatic LEDs and the first transmission requirement information, which specifically comprises:
determining second transmission requirement information for each data fragment according to the first transmission requirement information, wherein the first transmission requirement information includes bandwidth and rate requirement parameters,
selecting the monochromatic LEDs according to the second transmission requirement information to obtain candidate monochromatic LEDs, wherein a number of the candidate monochromatic LEDs is greater than or equal to the second predetermined number and less than or equal to the first predetermined number,
when the number of candidate monochromatic LEDs exceeds the second predetermined number, determining the second predetermined number of the candidate monochromatic LEDs as target monochromatic LEDs according to the light emission characteristics of the candidate monochromatic LEDs, which specifically comprises:
obtaining a light emission characteristic parameter of each candidate monochromatic LED, wherein the light emission characteristic parameter includes: emission wavelength, spectral width, and light intensity,
obtaining a visual acuity function value of each candidate monochromatic LED according to the emission wavelength and a visual acuity function,
determining an eye interference index for each candidate monochromatic LED based on the visual acuity function value, emission wavelength, spectral width, and light intensity, wherein the eye interference index is positively correlated with the visual acuity function value and light intensity, and negatively correlated with the spectral width and light intensity,
sorting the candidate monochromatic LEDs in descending order of the eye interference index, and selecting top the second predetermined number of candidate monochromatic LEDs as the target monochromatic LEDs;
when the number of candidate monochromatic LEDs is equal to the second predetermined number, assigning the candidate monochromatic LEDs as target monochromatic LEDs,
processing corresponding data fragments for each target monochromatic LED according to a preset modulation algorithm corresponding to each monochromatic LED, thereby generating respective light source control signals,
and, controlling the target monochromatic LEDs to perform optically-carried information transmission according to the light source control signals.

2. The method according to claim 1, wherein the step of processing corresponding data fragments for each target monochromatic LED according to a preset modulation algorithm corresponding to each monochromatic LED, thereby generating respective light source control signals comprises:
obtaining frequency response characteristics of each target monochromatic LED, wherein the frequency response characteristics include: operating frequency range, bandwidth capacity, modulation efficiency, and maximum transmission rate;
obtaining the second transmission requirement information for each data fragment, wherein the second transmission requirement information includes: data fragment bandwidth requirement, data fragment rate requirement, and priority,
calculating a difference between the bandwidth capacity of each target monochromatic LED and the bandwidth requirement of each corresponding data fragment, referred to as a first difference value;
calculating a difference between the maximum transmission rate of each target monochromatic LED and the data fragment rate requirement of each corresponding data fragment, referred to as a second difference value;
establishing an initial matching list for each data fragment according to the first difference value and second difference value, wherein the initial matching list includes several target monochromatic LEDs that meet a preset transmission condition, and the preset transmission condition includes: the first difference value being greater than or equal to a first difference threshold and the second difference value being greater than or equal to a second difference threshold;
sorting each initial matching list in ascending order according to a weighted calculation of the first difference value and the second difference value;
when duplicate target monochromatic LEDs exist in the initial matching lists, removing the duplicate target monochromatic LED based on the priority;
establishing a mapping relationship between the data fragment and the first target monochromatic LED in corresponding initial matching list;
determining a target modulation algorithm according to the second transmission requirement information of the data fragment, the frequency response characteristics of corresponding target monochromatic LED, and preset modulation algorithm, wherein the preset modulation algorithms include: PPM modulation algorithm, PAM modulation algorithm, QAM modulation algorithm, and OFDM modulation algorithm;
encoding and modulating the data fragment by corresponding target modulation algorithm, thereby generating respective light source control signals.

3. The method according to claim 2, wherein the step of determining a target modulation algorithm according to the second transmission requirement information of the data fragment, the frequency response characteristics of the corresponding target monochromatic LED, and preset modulation algorithm comprises:
assigning several preset modulation algorithms that satisfy corresponding second transmission requirement information for each data fragment based on the frequency response characteristics of the corresponding target monochromatic LED, referred to as the first intermediate modulation algorithms;
obtaining an estimated optical pulse frequency of the data fragment after modulation by the corresponding first intermediate modulation algorithm;
obtaining corresponding critical flicker frequency according to the emission wavelength of each target monochromatic LED;
filtering the first intermediate modulation algorithms for each data fragment based on the critical flicker frequency and the estimated optical pulse frequency to obtain several second intermediate modulation algorithms;
determining the target modulation algorithm for each data fragment according to the second intermediate modulation algorithm.

4. The method according to claim 2, wherein, after the step of controlling the target monochromatic LEDs to perform optically-carried information transmission according to the light source control signals, the method further comprises:
monitoring qualities of information transmission in real-time to obtain communication quality monitoring results of each target monochromatic LED, wherein the communication quality monitoring results include signal strength, error rate, and transmission delay;
when the signal strength of one target monochromatic LED is below a preset signal strength threshold, and/or its error rate exceeds a preset error rate threshold, and/or its transmission delay exceeds a preset delay threshold, designating target monochromatic LED as an LED to be switched;
determining at least one monochromatic LED as a target switch LED based on the data fragment corresponding to the LED to be switched;
controlling the target switch LED to transmit the data fragments corresponding to the LED to be switched according to a preset light source switching rule.

5. The method according to claim 4, wherein the step of determining at least one monochromatic LED as a target switch LED based on the data fragment corresponding to the LED to be switched comprises:
acquiring the second transmission requirement information for the data fragment corresponding to the LED to be switched, wherein the second transmission requirement information includes: data fragment bandwidth requirement, data fragment rate requirement, and priority;
caching the data fragment corresponding to the LED to be switched to obtain a cached data fragment;
when the second predetermined number is less than the first predetermined number, acquiring the monochromatic LEDs other than the target monochromatic LED as first backup switch LEDs;
obtaining wavelength similarities between the emission wavelength of each first backup switch LED and the emission wavelength of the LED to be switched;
selecting the first backup switch LED that meets a preset switching condition as a target switch LED according to the wavelength similarity similarities, the second transmission requirement information, and the frequency response characteristics of each first backup switch LED;
when the second predetermined number equals the first predetermined number, acquiring bandwidth margin of the target monochromatic LEDs other than the LED to be switched based on the communication quality monitoring results;
obtaining several first backup switch LED combinations that satisfy the second transmission requirement information of the data fragment corresponding to the LED to be switched according to the bandwidth margin, wherein each first backup switch LED combination includes at least one target monochromatic LED other than the LED to be switched, and at least one target monochromatic LED differs between any two first backup switch LED combinations;
filtering to obtain several second backup switch LED combinations according to the frequency response characteristics of the target monochromatic LEDs in each first backup switch LED combination and the data fragment rate requirement of the data fragment corresponding to the LED to be switched;
calculating redundancy degree for each second backup switch LED combination according to a weighted calculation of a redundancy light source amount and a redundancy bandwidth capacity for each second backup switch LED combination, wherein a weight of the redundancy light source amount is greater than a weight of the redundancy bandwidth capacity;
selecting the second backup switch LED combination with smallest redundancy degree to determine the target switch LED.

6. The method according to claim 5, the step of controlling the target switch LED to transmit the data fragments corresponding to the LED to be switched according to a preset light source switching rule comprises:
splitting the data fragment corresponding to the LED to be switched according to a preset data splitting ratio to obtain a first data fragment and a second data fragment;
controlling the LED to be switched to transmit the first data fragment and controlling the target switch LED to transmit the second data fragment according to the preset modulation 15 algorithm;
obtaining transmission quality of the second data fragment on the target switch LED at preset time intervals;
if the transmission quality meets preset quality conditions, increasing the preset data splitting ratio by a preset incremental proportion, and returning to the step of splitting the data fragment corresponding to the LED to be switched according to a preset data splitting ratio to obtain a first data fragment and a second data fragment, until the data fragment of the LED to be switched is entirely transmitted through the target switch LED;
when the data fragment of the LED to be switched is entirely transmitted through the target switch LED, acquiring current second actual emission intensities of each target monochromatic LED and the target switch monochromatic LED;
obtaining a third light source control signal according to the second actual emission intensity, preset emission intensity, and ambient light intensity;
controlling the LED to be switched for illumination according to the third light source control signal.

7. The method according to claim 5, wherein the preset switching condition comprises:
the wavelength similarities meet or exceed a certain threshold; and/or, the bandwidth capacity is greater than or equal to the bandwidth requirement of the data segment; and/or the maximum transmission rate is greater than or equal to the rate requirement of the data segment.

8. The method according to claim 7, wherein the target switch LED's maximum transmission rate is at least 10% higher than the rate requirement.

9. The method according to claim 1, wherein the step of controlling the target monochromatic LEDs to perform optically-carried information transmission according to the light source control signals comprises:
acquiring an ambient light parameter, where the ambient light parameters include ambient light intensity and ambient spectral distribution;
when the first predetermined number equals the second predetermined number, adjusting each light source control signal according to the ambient light intensity, ambient spectral distribution, and a preset filtering algorithm to obtain a first target control signal;
according to the first target control signal, controlling the corresponding target monochromatic LEDs to perform optically-carried information transmission;

when the first predetermined number is greater than the second predetermined number, adjusting each light source control signals for according to the ambient light parameters, preset filtering algorithm, and preset light emission intensity to obtain a first target control signal;

acquiring a first actual light emission intensity for each target monochromatic LED based on the first target control signal;

acquiring a supplementary light emission intensity according to the first actual light emission intensity, the preset light emission intensity, and the ambient light intensity;

calculating a total target light emission intensity for the monochromatic LEDs other than the target monochromatic LEDs according to the supplementary light emission intensity;

determining target light emission intensity for each monochromatic LED other than the target monochromatic LEDs according to the total target light emission intensities and the ambient spectral distribution;

generating second target control signals for all unused monochromatic LEDs based on the target light emission intensity;

controlling the corresponding monochromatic LEDs to optically-carried information transmission according to the first target control signals and the second target control signals.

10. The method according to claim 1, wherein the step of splitting data to be transmitted according to first transmission requirement information to obtain a second predetermined number of data fragments comprises acquiring basic parameters of the data to be transmitted, determining the first transmission requirement information based on the basic parameters, determining the second predetermined number based on bandwidth capacity of each monochromatic LED, and, performing data segmentation on the data to be transmitted based on data type and the second predetermined number.

11. The method according to claim 1, wherein the first predetermined number is four, the first predetermined number is four, the monochromatic LEDs are respectively designated as a first monochromatic LED, a second monochromatic LED, a third monochromatic LED, and a fourth monochromatic LED.

12. The method according to claim 11, wherein the first monochromatic LED emits light within 480-520 nm, the second monochromatic LED emits light within 530-540 nm, the third monochromatic LED emits light within 640-660 nm, and the fourth monochromatic LED emits light within 680-700 nm, each monochromatic LED is excited by blue light chips.

13. The method according to claim 12, wherein the blue light chip comprises at least one first blue light chip and one second blue light chip, when the first blue light chip and the second blue light chip are combined, the primary wavelength of the blue light chips falls between 447-457 nm.

14. A light source device, comprising at least one processor, at least one memory, and computer program instructions stored in the memory, wherein when the computer program instructions are executed by the processor, the method as described in claim 1 is implemented.

* * * * *